(12) United States Patent
Washihira et al.

(10) Patent No.: US 8,974,235 B2
(45) Date of Patent: Mar. 10, 2015

(54) ELECTRIC CONNECTION BOX AND RELAY MODULE

(75) Inventors: Kenichi Washihira, Yokkaichi (JP); Kenichi Nishikawa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 495 days.

(21) Appl. No.: 13/383,307

(22) PCT Filed: May 10, 2010

(86) PCT No.: PCT/JP2010/057862
§ 371 (c)(1),
(2), (4) Date: Jan. 31, 2012

(87) PCT Pub. No.: WO2011/004650
PCT Pub. Date: Jan. 13, 2011

(65) Prior Publication Data
US 2012/0134130 A1    May 31, 2012

(30) Foreign Application Priority Data

Jul. 10, 2009    (JP) ................................. 2009-163928

(51) Int. Cl.
*H01R 12/00*    (2006.01)
*H05K 1/00*     (2006.01)
*H05K 5/00*     (2006.01)
*B60R 16/023*   (2006.01)
*H02G 3/16*     (2006.01)

(52) U.S. Cl.
CPC .............. *B60R 16/0239* (2013.01); *H02G 3/16* (2013.01)
USPC .......... 439/76.2; 361/752; 361/819; 174/535; 174/541; 220/324

(58) Field of Classification Search
USPC .......... 361/752, 819; 174/541, 535; 439/76.2; 220/324
See application file for complete search history.

(56) References Cited

U.S. PATENT DOCUMENTS

| | | | | | |
|---|---|---|---|---|---|
| 5,179,503 | A | * | 1/1993 | Fouts et al. | 361/729 |
| 6,010,341 | A | * | 1/2000 | Matsuoka | 439/76.2 |
| 6,022,247 | A | * | 2/2000 | Akiyama et al. | 439/701 |
| 6,196,882 | B1 | * | 3/2001 | Sato et al. | 439/701 |
| 7,619,896 | B2 | * | 11/2009 | Yamashita et al. | 361/720 |
| 7,670,184 | B2 | * | 3/2010 | Akahori et al. | 439/620.27 |
| 7,837,480 | B2 | * | 11/2010 | Akahori | 439/76.2 |
| 8,163,994 | B2 | * | 4/2012 | Taniguchi et al. | 174/50 |
| 2003/0109150 | A1 | * | 6/2003 | Saka et al. | 439/76.2 |
| 2004/0021547 | A1 | * | 2/2004 | Vicenza et al. | 337/186 |

(Continued)

FOREIGN PATENT DOCUMENTS

| | | |
|---|---|---|
| JP | A 09-140029 | 5/1997 |
| JP | A 2001-095131 | 4/2001 |
| JP | A 2004-072907 | 3/2004 |

OTHER PUBLICATIONS

International Search Report issued in International Patent Application No. PCT/JP2010/057862; mailed Aug. 3, 2010.

*Primary Examiner* — Adrian S Wilson
*Assistant Examiner* — Abhishek Rathod
(74) *Attorney, Agent, or Firm* — Oliff PLC

(57) ABSTRACT

A relay box is provided with: a main housing; and a mounting section, which is provided in the main housing, and has selectively mounted thereon a relay block having a plug-in relay mounted thereon and removable therefrom, and a relay module which houses, in a module case, a circuit configuring body having a switching element mounted thereon.

5 Claims, 16 Drawing Sheets

(56) References Cited

U.S. PATENT DOCUMENTS

| | | | |
|---|---|---|---|
| 2004/0198080 A1* | 10/2004 | Kiyota | 439/76.2 |
| 2005/0036260 A1* | 2/2005 | Nakamura et al. | 361/104 |
| 2006/0035495 A1* | 2/2006 | Iwata et al. | 439/160 |
| 2006/0119178 A1* | 6/2006 | Kutlugil | 307/10.1 |
| 2007/0270033 A1* | 11/2007 | Yoshida et al. | 439/587 |
| 2008/0180884 A1* | 7/2008 | Parrish | 361/624 |
| 2008/0200045 A1* | 8/2008 | Akahori et al. | 439/76.2 |
| 2009/0203236 A1* | 8/2009 | Akahori et al. | 439/76.1 |
| 2009/0218129 A1* | 9/2009 | Taniguchi et al. | 174/503 |
| 2009/0247015 A1* | 10/2009 | Taniguchi et al. | 439/620.33 |
| 2009/0280661 A1* | 11/2009 | Akahori | 439/76.2 |

* cited by examiner

US 8,974,235 B2

ELECTRIC CONNECTION BOX AND RELAY MODULE

CROSS REFERENCE TO RELATED APPLICATIONS

This application is a national stage application of PCT Application No. PCT/JP2010/057862, filed on May 10, 2010, which claims priority to Japanese Patent Application No. 2009-163928, filed on Jul. 10, 2009, which are hereby incorporated by reference herein in their entireties.

TECHNICAL FIELD

Exemplary embodiments relate to an electric connection box and a relay module.

BACKGROUND

In the related art, a relay box disposed in an engine room or the like of a motor vehicle for distributing electric power from a vehicle-mounted power source to various types of electrical equipment is known (for example, see JP-A-2004-72907). In the relay box, a relay module including a housing accommodating a circuit component having a power circuit with switching devices or control circuits incorporated therein and a relay block including a synthetic resin casing accommodating plural plug-in relays may be mounted.

SUMMARY

Incidentally, the number of relays mounted in the relay box can be different depending on grades even though the types of motor vehicle may be the same. This is because, for example, in the case of low grade vehicles in which a low price is desirable, a reduction in number of relays to be mounted thereon may be desirable, or the relay module, which is highly functional but rather expensive, may be omitted.

However, the relay box having a configuration of the related art has a problem in that the number of plug-in relays and semiconductor switching devices for one relay box are uniformly determined, and a flexible response to the difference in specifications cannot be achieved.

In view of the related art, it is one object of this disclosure to provide an electric connection box that allows for flexible response to the specifications of the motor vehicle on which the electric connection box is to be mounted.

An electric connection box according to an exemplary embodiment can include a base; and a mounting portion to be provided on the base, in which a relay block having a plug-in relay mounted thereon or a relay module having a cover accommodating a circuit board with a switching device mounted thereon can be selectively mounted.

According to exemplary embodiments, the relay block and the relay module can be adapted to be mountable on the same mounting portion, and compatibility therebetween can be ensured. Accordingly, the relay block and the relay module can be used selectively depending on the necessity using the same base, so that the flexible design according to the demanded functions or cost can be achieved.

DETAILED DESCRIPTION

Figure 1:
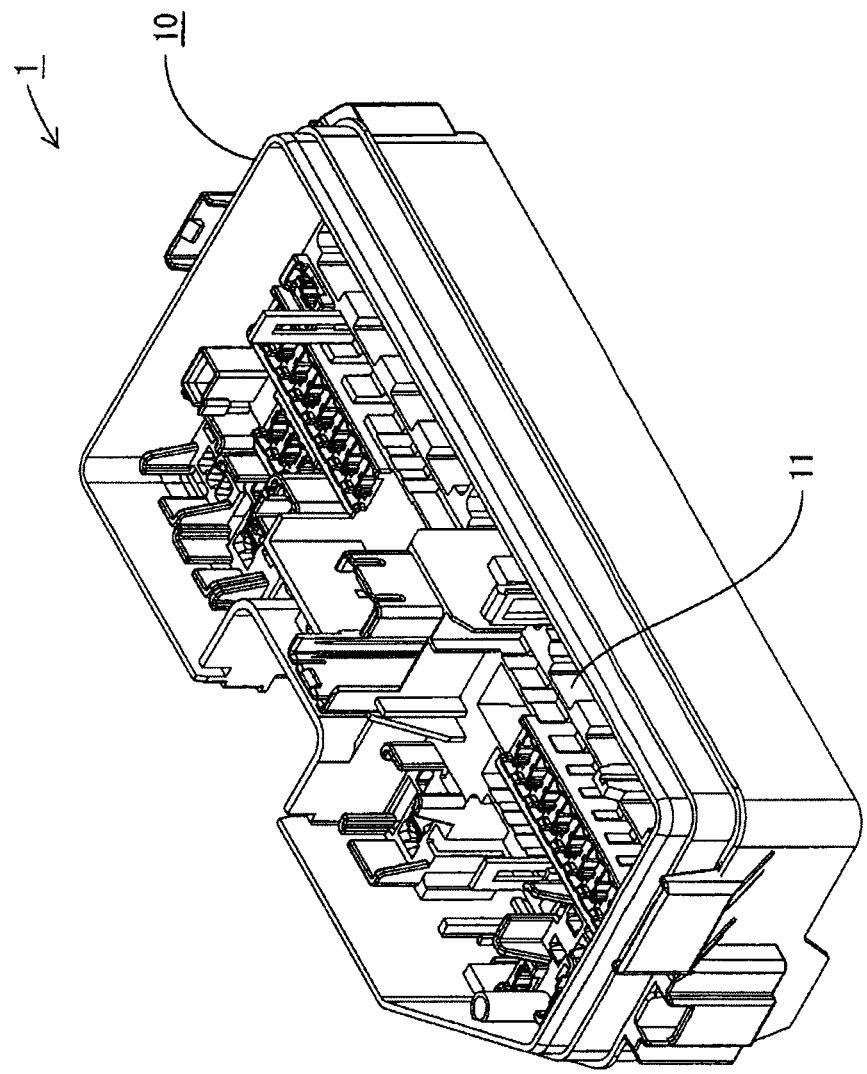
FIG. 1 is a perspective view of a relay box according to an embodiment.
Figure 2:
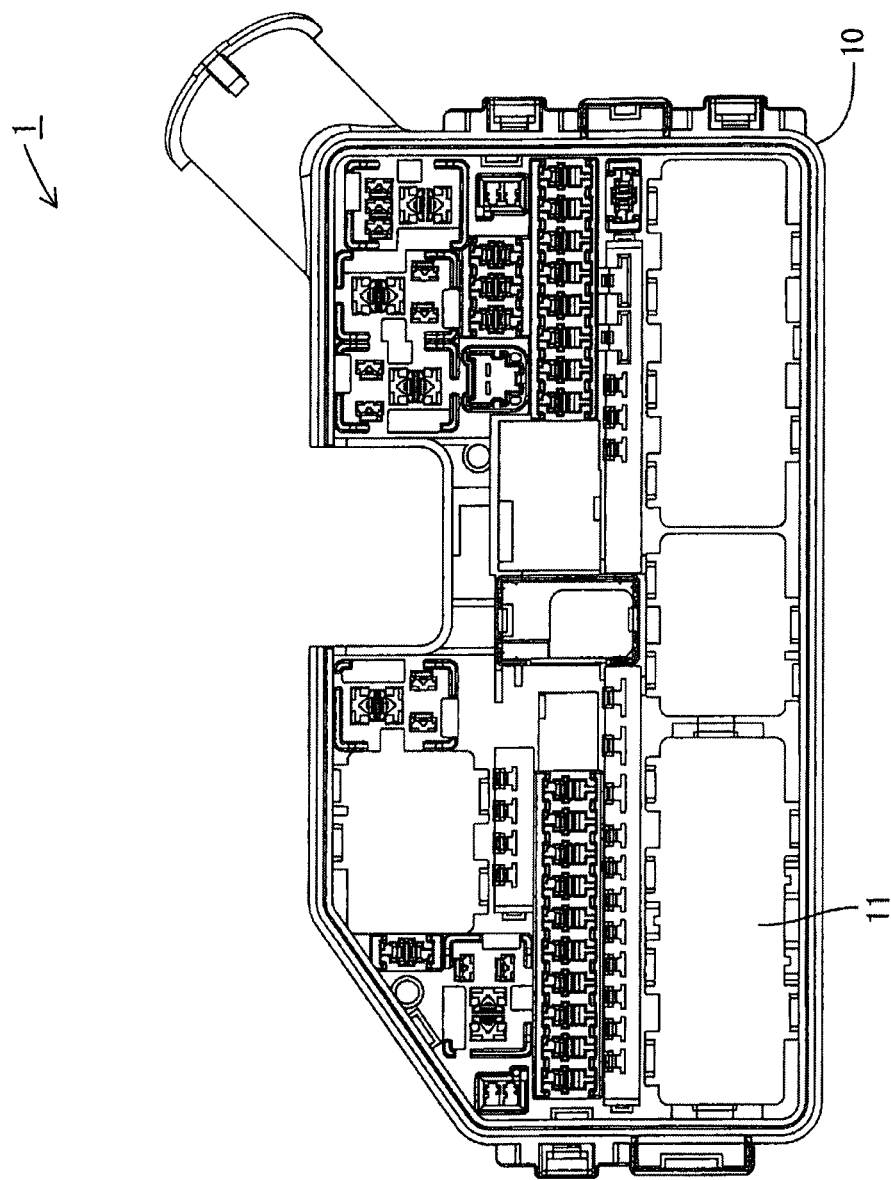
FIG. 2 is a top view of the relay box according to the embodiment.
Figure 3:
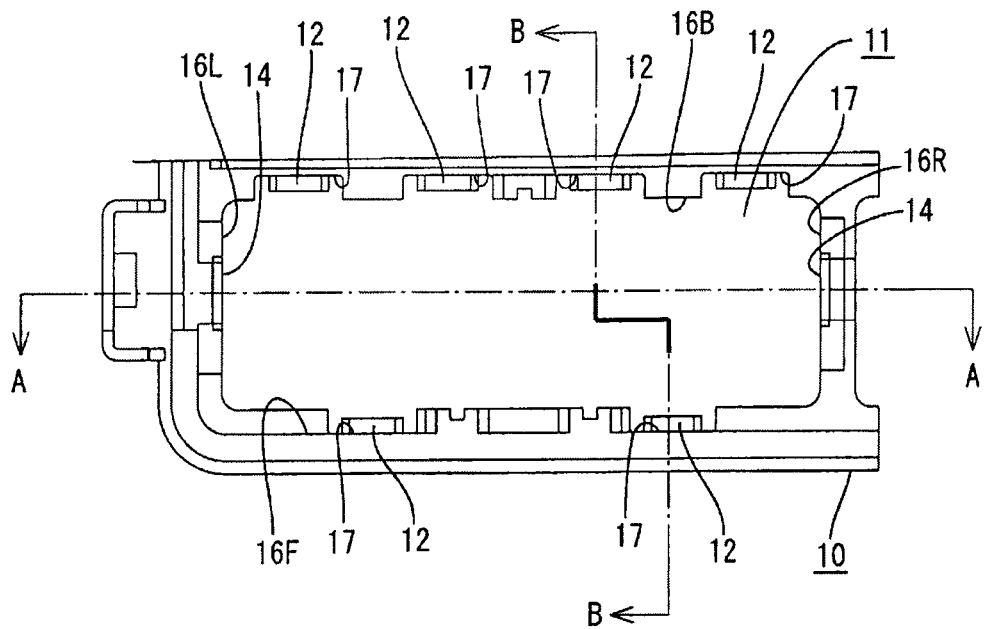
FIG. 3 is a partially enlarged top view of the relay box according to the embodiment.
Figure 4:
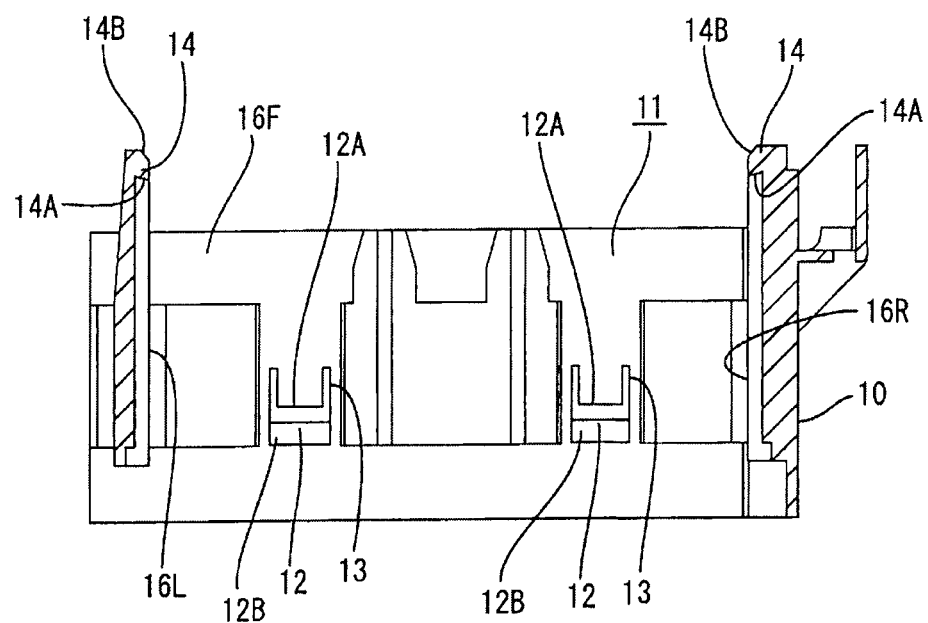
FIG. 4 is a cross-sectional view taken along the line A-A in FIG. 3.
Figure 5:
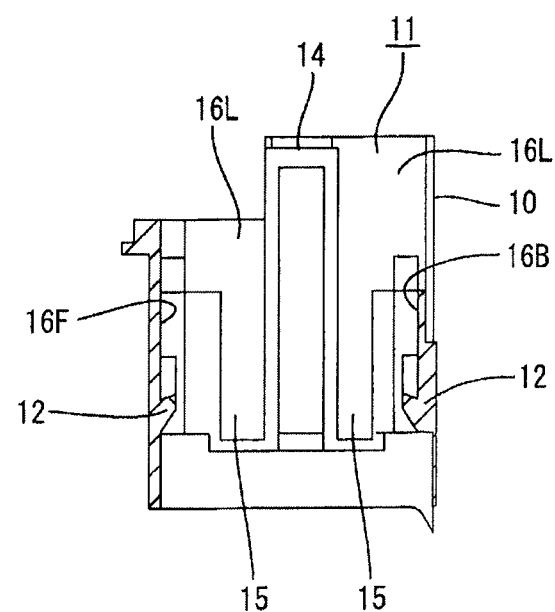
FIG. 5 is a cross-sectional view taken along the line B-B in FIG. 3.
Figure 6:
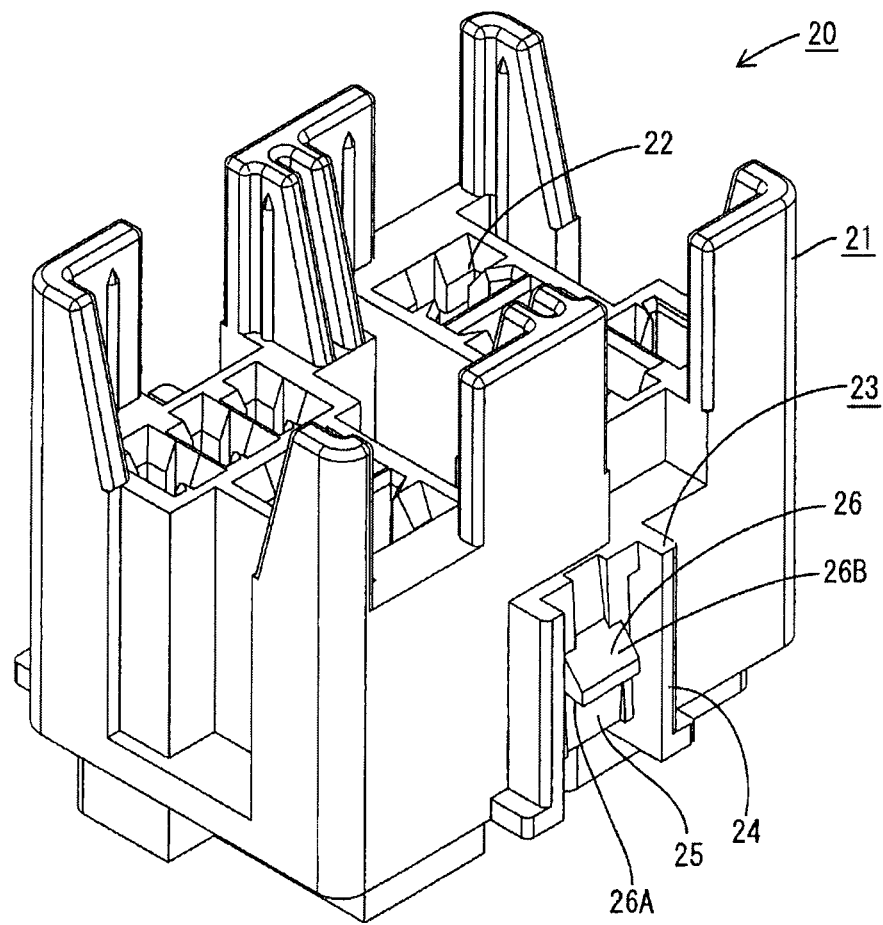
FIG. 6 is a perspective view of a relay block according to the embodiment.
Figure 7:
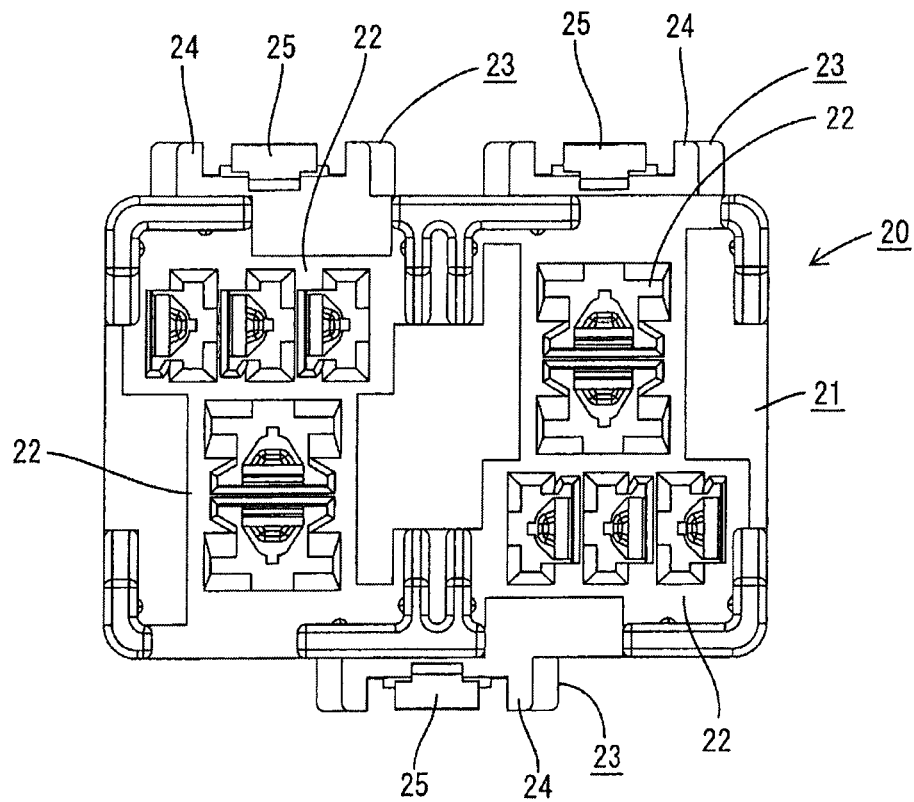
FIG. 7 is a top view of the relay block according to the embodiment.
Figure 8:
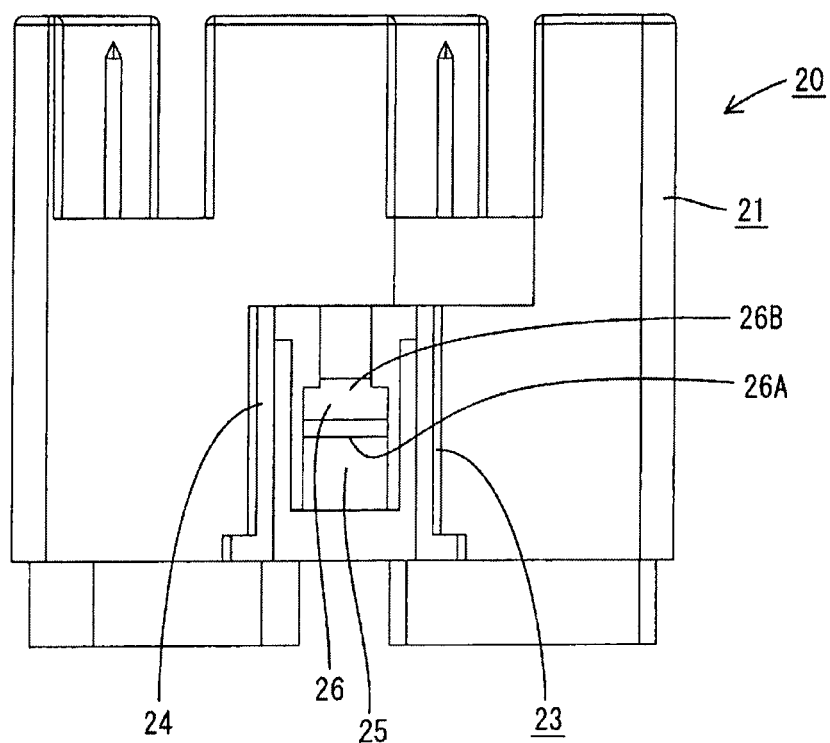
FIG. 8 is a front view of the relay block according to the embodiment.
Figure 9:
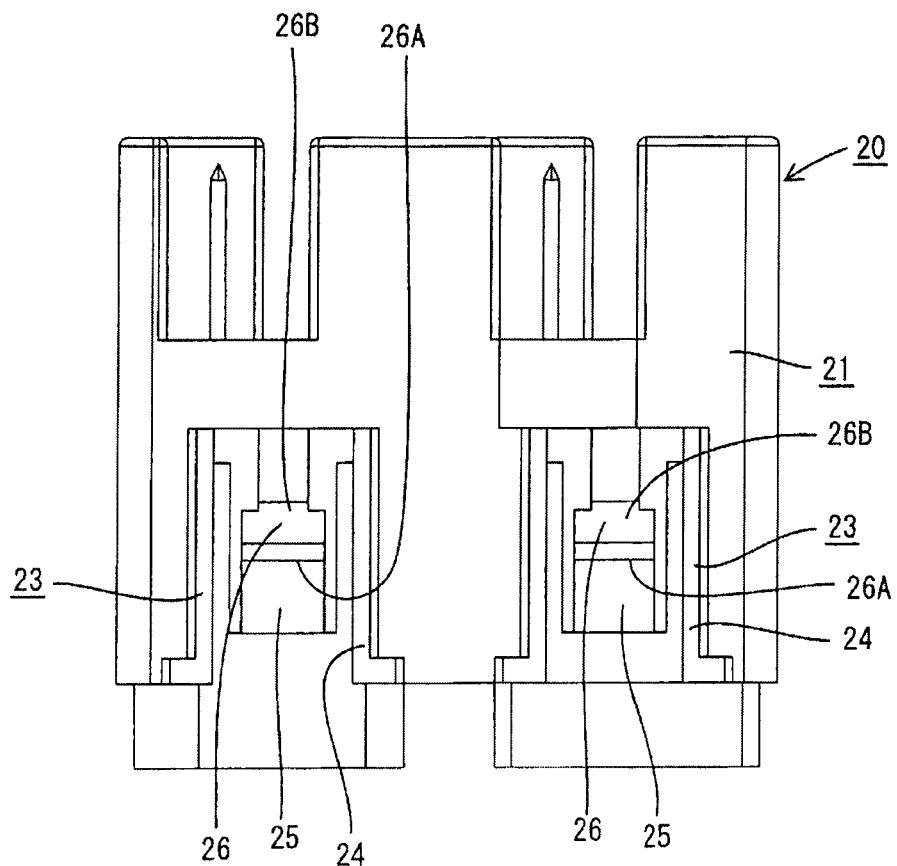
FIG. 9 is a back view of the relay block according to the embodiment.
Figure 10:
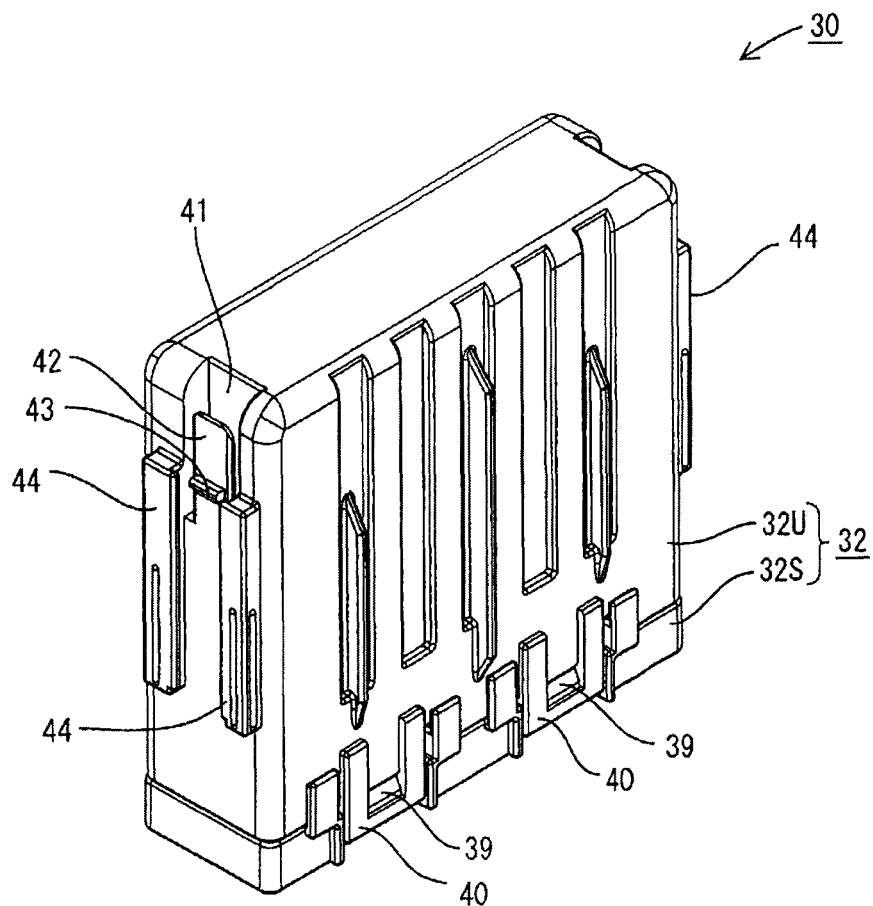
FIG. 10 is a perspective view of a relay module according to the embodiment.
Figure 11:
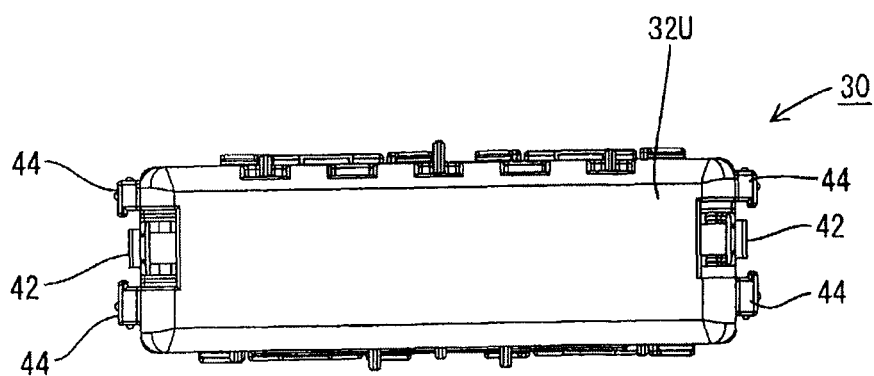
FIG. 11 is a top view of the relay module according to the embodiment.
Figure 12:
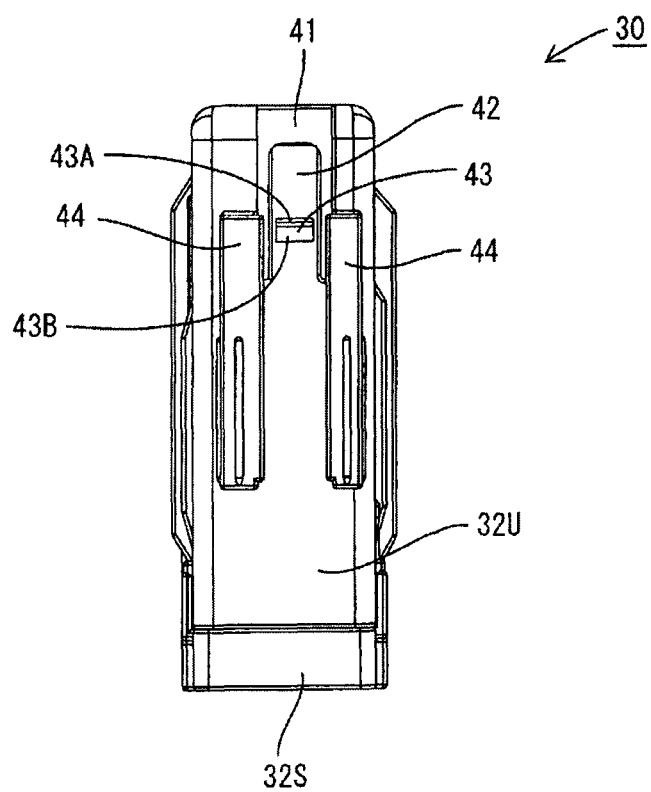
FIG. 12 is a right side view of the relay module according to the embodiment.
Figure 13:
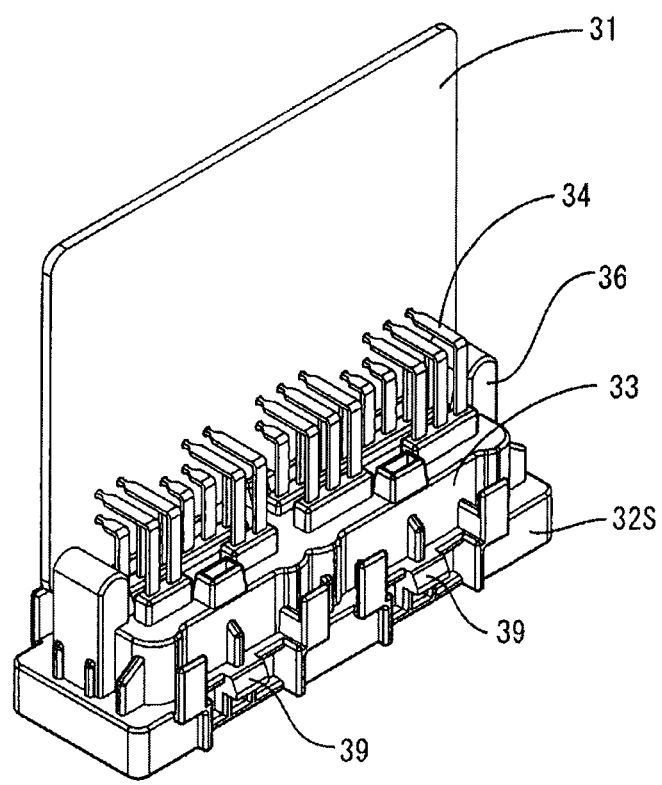
FIG. 13 is a perspective view showing a state in which a lower case is mounted on a circuit component according to the embodiment.
Figure 14:
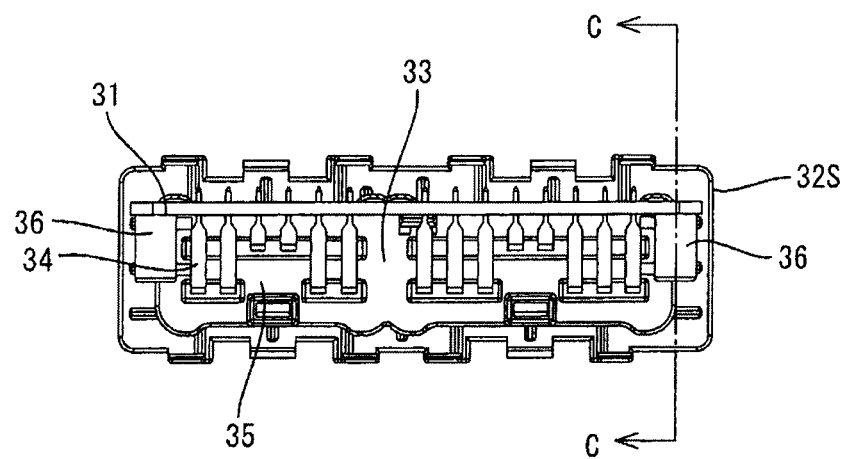
FIG. 14 is a top view showing a state in which the lower case is mounted on the circuit component according to the embodiment.
Figure 15:
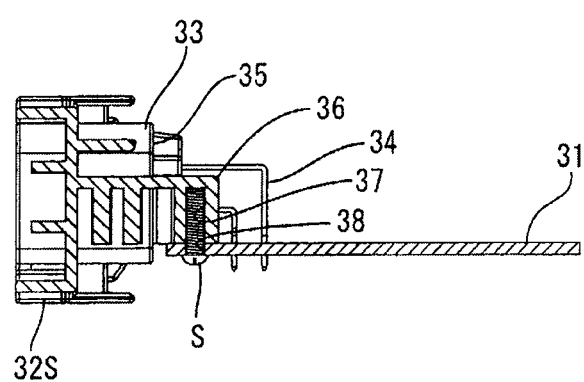
FIG. 15 is a cross-sectional view taken along the line C-C in FIG. 14.
Figure 16:
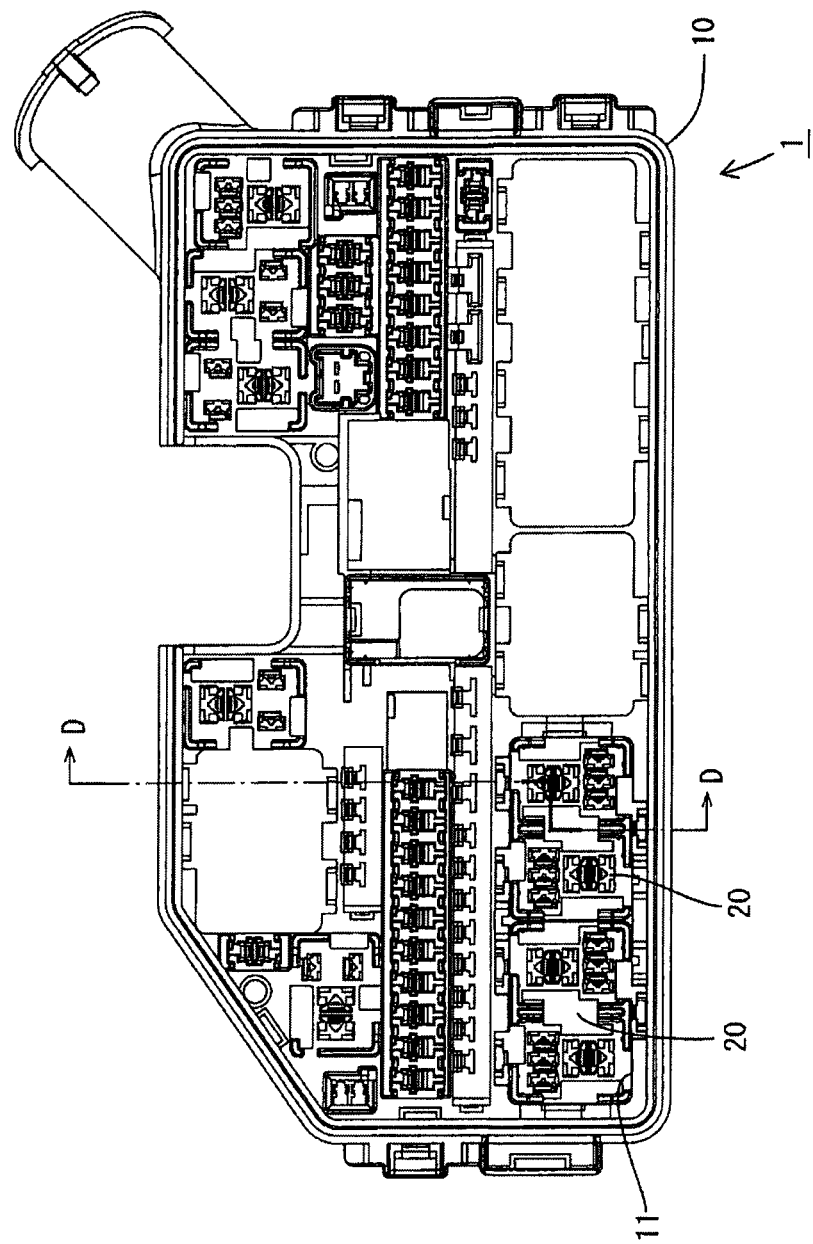
FIG. 16 is a top view showing a state in which the relay block is mounted on the relay box according to the embodiment.
Figure 17:
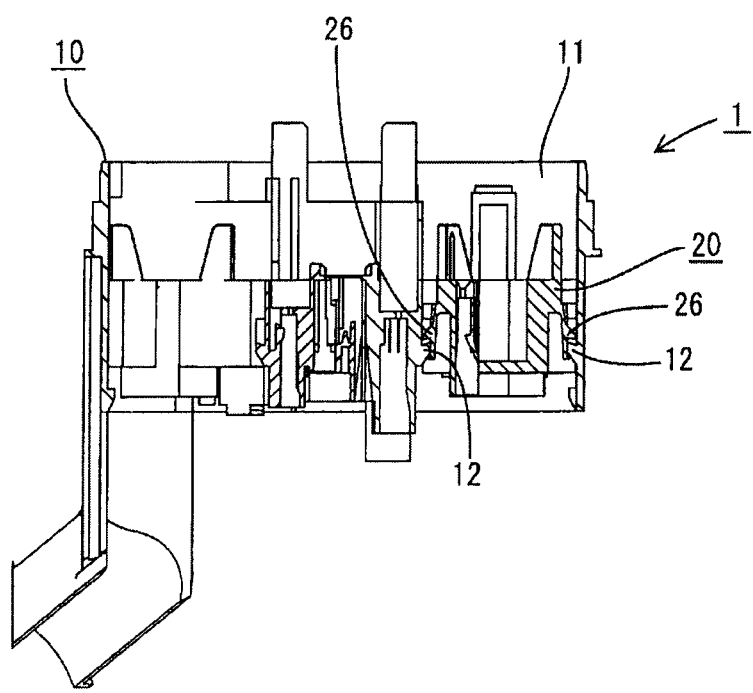
FIG. 17 is a cross-sectional view taken along the line D-D in FIG. 16.
Figure 18:
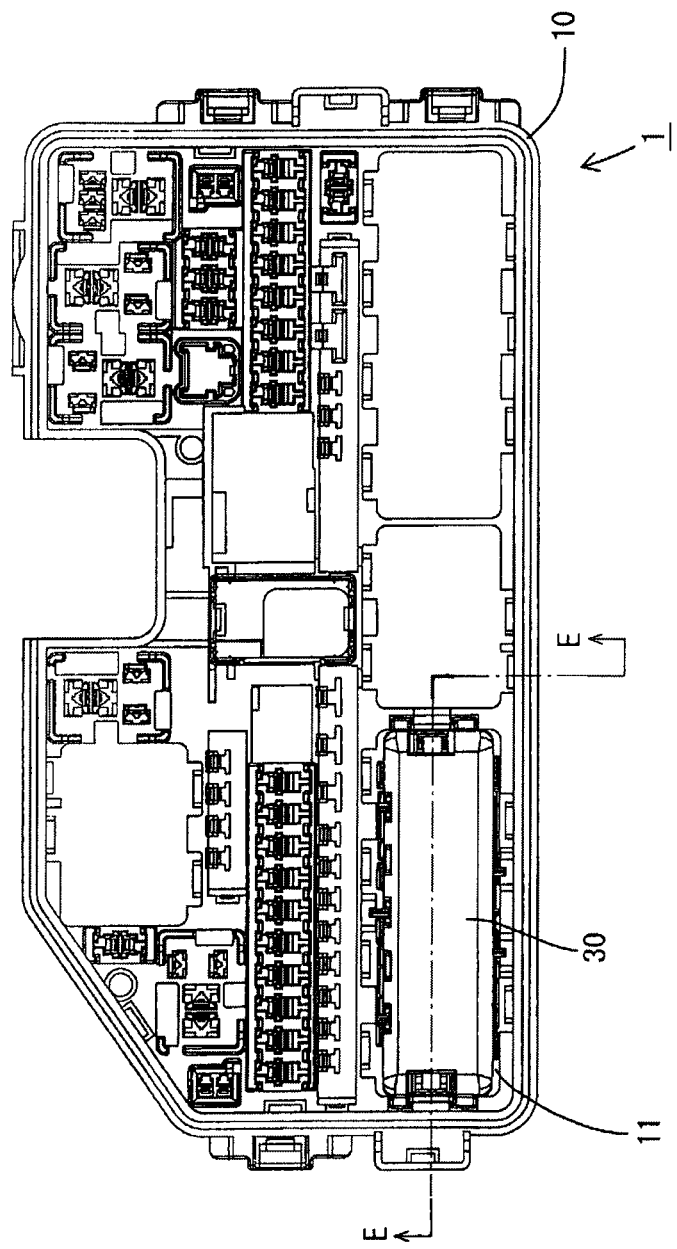
FIG. 18 is a top view showing a state in which the relay module is mounted on the relay box according to the embodiment.
Figure 19:
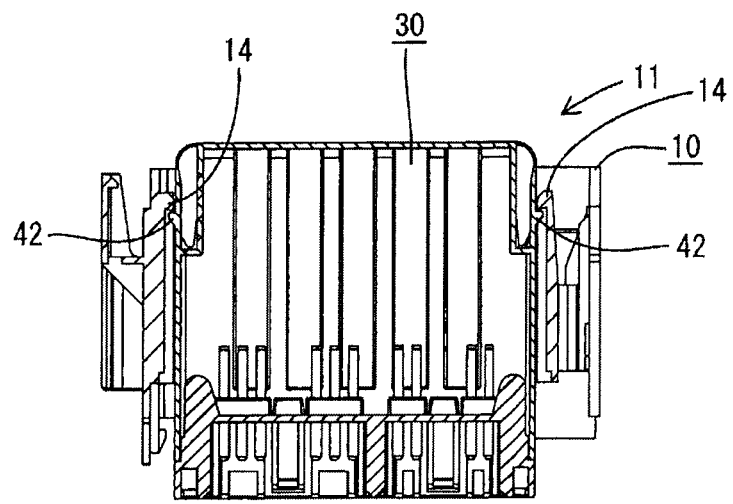
FIG. 19 is a cross-sectional view taken along the line E-E in FIG. 18.
Figure 20:
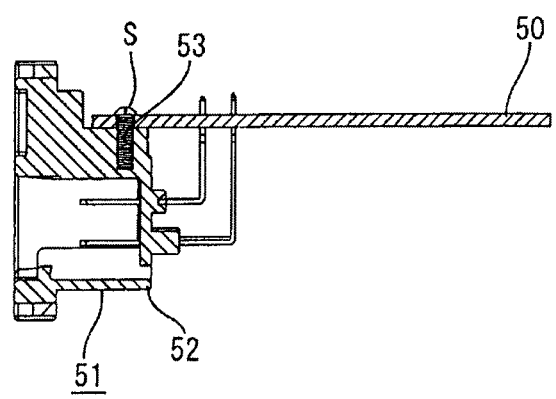
FIG. 20 is a cross-sectional view showing a state in which a lower case is mounted on a circuit component of the related art.

An exemplary embodiment will be described with reference to FIG. 1 to FIG. 20. The relay box in the embodiment (corresponding to an electric connection box) 1 can be disposed in an engine room of a motor vehicle or the like and can be configured to allow a relay module 30 and a relay block 20 to be mounted therein. In the description below, as regards the fore-and-aft direction, the front direction means obliquely right front in FIG. 1, as regards the up-and-down direction (vertical direction), the upper direction means the upside in FIG. 1, and the right-and-left direction (lateral direction) means the direction extending orthogonally to the fore-and-aft direction and the up-and-down direction (the obliquely right rear—obliquely left front in FIG. 1).

A relay box 1 includes a main housing formed of a synthetic resin (corresponding to a base) 10 and a mounting portion 11 provided in the main housing 10 so as to allow both of a relay block 20 and a relay module 30, described later, to be mounted therein. The mounting portion 11 can be a void portion opening upward and downward and having a laterally elongated parallelepiped shape, and can be adapted to accommodate two pieces of the relay blocks 20 or one piece of the relay module 30 therein. Block latching portions 12 which are engageable with block-side locking arms 25 and are provided on the relay block 20, and module locking claws 14 which are engageable with module-side locking arms 42 provided on the relay module 30, can be provided in the interior of the mounting portion 11, respectively.

Two of the block latching portions 12 can be provided on a front wall portion 16F of an inner wall portion of the mounting portion 11, and four of the block latching portions 12 can be provided on a rear wall portion 16B of the same. The front wall portion 16F and the rear wall portion 16B can be provided with depressions 17 which are capable of receiving swelled portions 23 provided on the relay block 20, and one each of the block latching portions 12 can be provided in a protruding condition at substantially the center of each of the depression 17 in the left-and-right direction. The respective block latching portions 12 can be formed into a block shape projecting inward. The upper side surfaces can be locking surfaces 12A which engage the block-side locking arms 25 of the relay block 20, and a pair of linear rib portions 13 extending upward can be provided in a protruding condition from both side edges thereof. In contrast, the lower side surfaces can be tapered guiding surfaces 12B inclining outward as they go downward.

One each of the module locking claws 14 can be provided on both of left and right wall portions 16R, 16L of the inner wall portion of the mounting portion 11. The module locking claws 14 can be provided by shaving off the left and right both wall portions 16R, 16L of the mounting portion 11 at substantially center portions of in the fore-and-aft direction except for the upper end portions, and can be formed into a hook shape projecting inward respectively. Then, lower side surfaces can be locking surfaces 14A which engage module-side locking arms 42 of the relay module 30, and upper end surfaces can be tapered guiding surfaces 14B inclining outward as they extend upward.

Provided on the left and right both wall portions 16R, 16L at positions away to a certain distance from the module locking claws 14 in the fore-and-aft direction can be a pair of guide grooves 15 which can receive the guide rails 44 of the relay module 30. The guide grooves 15 can be opened upward, and also inward of the mounting portion 11, and can be formed into an elongated groove shape extending in the vertical direction.

The relay block 20 includes a block housing 21 formed of a synthetic resin into a block shape as a whole. The width of the block housing 21 in a fore-and-aft direction can be substantially the same as the width of the mounting portion 11 of the relay box 1 in the fore-and-aft direction, and the width in the left-and-right direction can be approximately half the width of the mounting portion 11 in the left-and-right direction. Therefore, two of the relay blocks 20 can be accommodated in the mounting portion 11.

Formed in the block housing 21 can be relay mounting portions 22 for mounting plug-in relays. The plug-in relays (not shown) can be mounted to the relay mounting portions 22 from below and, in a state in which the plug-in relays can be mounted, cable lines of the plug-in relays can be drawn out from the lower side.

Formed on an outer wall surface of the block housing 21 can be the swelled portions 23 swelled outward with respect to other portions, and one of them can be formed on a front wall surface and two of them can be formed on a rear wall surface. A pair of side wall portions 24 extending in the vertical direction can be projected in a protruding condition outward from both left and right side edges of each of the swelled portions 23, and block-side locking arms 25 can be disposed inside the side wall portions 24. The block-side locking arms 25 can be formed into a cantilevered shape extending downward from upper end portions of the swelled portions 23 as proximal end portions, and can be adapted to be resiliently deformable along the fore-and-aft direction of the block housing 21. Provided on the block-side locking arms 25 substantially at the center positions in the vertical direction so as to project outward can be block-side locking projections 26. Upper surfaces of the block-side locking projections 26 can be tapered guiding surfaces 26B inclining inward as they go upward. In contrast, lower side surfaces thereof can be locking surfaces 26A engaging the block latching portions 12 the relay box 1.

The relay module 30 includes a circuit component (corresponding to a circuit board) 31, and a module case (corresponding to a cover) 32 which can be capable of accommodating the circuit component 31.

The circuit component 31 can include a printed board having a predetermined conducting path formed on the surface thereof, and mounted parts such as semiconductor switching devices mounted on the surface of the printed board, although not illustrated in detail. In the embodiment, six of the semiconductor switching devices can be mounted on the printed board.

The module case 32 which accommodates the circuit component 31 can be formed of a synthetic resin, and includes a lower case 32S configured to be assembled to the circuit component 31 from below and an upper case 32U configured to accommodate the circuit component 31 in the interior thereof and then be assembled from above.

The lower case 32S can be formed into a box-shape being slightly wider than the circuit component 31 as a whole. The lower case 32S serves also as a connector for connection to external connecters (not shown), can be opened downward, and can be provided with plural tubular hood portions 33 arranged side by side in the left-and-right direction so as to allow the external connectors to be fitted thereto. Ends of the respective terminals 34 bent into an L-shape can be projected into the interior of the respective hood portions 33 through a ceiling wall 35. The other ends of the terminals 34 can be inserted into through holes opened in the circuit component 31, and can be fixed by soldering.

The lower case 32S can be provided at both side edges thereof with screw clamp portions (corresponding to fixing portion described in claims 36 at the right of the hood portion 33 on the right side and at the left of the hood portion 33 on the left side. The screw clamp portions 36 can be formed to be slightly higher than the hood portions 33, and can be provided with screw holes (corresponding to the fixing portion in claims 37 at positions slightly higher than the ceiling wall 35 of the hood portions 33. In contrast, the circuit component 31 can be formed with hole portions 38 for allowing passage of screws S at positions aligned with the screw holes. The lower case 32S can be fixed to the circuit component 31 by inserting the screws S into the hole portions 38 and the screw holes 37 from the rear surface side of the circuit component 31 and tightening the same.

A front wall surface and a rear wall surface of an outer wall surface of the lower case 32S can be provided with lower-case-side locking projections 39 configured to engage locking strips 40 of the upper case 32U so as to project outward.

The upper case 32U has a flat box-shape opening downward, and can be configured to cover an entire circumference (front, rear, left, and right) of the circuit component 31 and an upper side entirely. The lower end portion (opening end portion) of the upper case 32U can be provided with the upper-case-side locking strips 40 which can be capable of engaging the lower-case-side locking projections 39 provided on the lower case 32S. By the engagement between the upper-caseside locking strips 40 and the lower-case-side locking projections 39, the upper case 32U and the lower case 32S can be maintained in the assembled state. For reference's sake, in a state in which the upper case 32U and the lower case 32S can be assembled, the lower end portion of the lower case 32S projects downward from the upper case 32U.

An outer wall surface on the right side and an outer wall surface on the left side of the upper case 32U can be provided with groove portions 41 respectively at center positions in the fore-and-aft direction thereof so as to extend downward from upper ends to positions to some extent. Module-side locking arms 42 can be provided in the groove portions 41 respectively. The respective module-side locking arms 42 can be formed into a cantilevered shape extending respectively upward from outer edge portions of lower ends of the groove portions 41, and can be configured to be resiliently deformable along the left-and-right direction of the upper case 32U. On the module-side locking arms 42 substantially at the center positions thereof in the vertical direction, module-side locking projection 43 can be provided so as to project outward. Lower side surfaces of the module-side locking projections 43 can be tapered guiding surfaces 43B inclining inward as they go downward. In contrast, the upper side surfaces thereof can be locking surfaces 43A engaging the module locking claws 14 of the relay box 1.

Also, elongated guide rails 44 extending in the vertical direction can be provided so as to project outward at positions slightly apart from the module-side locking arms 42 in both lateral directions.

The widths of the module case 32 in the fore-and-aft direction and in the left-and-right direction can be substantially the same as the widths of the mounting portion 11 of the relay box 1 in the fore-and-aft direction and in the left-and-right direction, and one piece of the relay module 30 can be accommodated in the interior of each of the mounting portions 11.

Subsequently, assembly of the relay block 20 and the relay module 30 to the relay box 1 will be described.

First of all, a case of assembling the relay block 20 will be described. When assembling the relay block 20 to the mounting portion 11 of the relay box 1, plug-in relays are attached to the relay block 20 in advance, and then the relay block 20 is inserted into the mounting portion 11. At this time, since the cable lines being drawn out from the plug-in relay extend downward of the relay block 20, the relay block 20 is inserted from the opening on the lower side of the mounting portion 11.

Since two of the relay blocks 20 can be mounted in the interior of each of the mounting portions 11, one of the relay blocks 20 can be inserted to either the left side or the right side of the mounting portions 11.

When the relay block 20 is pushed inward of the mounting portion 11, three of the block latching portions 12 positioned on the side where the relay block 20 is inserted from among six of the block latching portions 12 provided on the inner wall portion of the mounting portion 11 engage three of the block-side locking arms 25 provided on the front and rear walls of the relay block 20. More specifically, the block latching portions 12 climb over the guiding surfaces of the block-side locking projections 26 provided on the block-side locking arms 25 and the block-side locking arms 25 are resiliently deformed inward. Then, when the relay block 20 is further pushed inward, the block latching portions 12 climb over the block-side locking projections 26 and the block-side locking arms 25 are resiliently restored. In this state, the block-side locking projections 26 can be just fitted between a pair of the rib portions 13 formed on upper portions of the block latching portions 12, and the locking surfaces of the block latching portions 12 and the locking surfaces of the block-side locking projections 26 engage with each other. Accordingly, the relay block 20 can be fixed in a retained state.

When one of the relay blocks 20 is mounted, the other relay block 20 can be mounted in the mounting portion 11 in the same manner.

Subsequently, a case where the relay module 30 is assembled will be described. The external connector connected to the distal end of a wire harness is inserted from the opening on the lower side of the mounting portion 11, and is pulled upward through the interior of the mounting portion 11. Subsequently, the external connector is fitted to the hood portion 33 of the relay module 30 at a position above the mounting portion 11. Then, the wire harness is brought into a state of being guided from the lower side of the relay module 30 and passed through the mounting portion 11. In this state, the relay module 30 can be inserted from the upper opening of the mounting portion 11 in a state in which the guide rails 44 provided on the left and right outer wall portions of the relay module 30 are aligned with the guide grooves 15 provided on the left and right inner wall portions of the mounting portion 11.

When the relay module 30 is inserted into the mounting portion 11, a pair of the module locking claws 14 provided on the inner wall portions of the mounting portion 11 engage the module-side locking arms 42 provided on the left and right outer wall portion of the relay module 30. More specifically, the module locking claws 14 climb over the guiding surfaces of the module-side locking projections 43 provided on the module-side locking arms 42 and the module-side locking arms 42 can be resiliently deformed inward. Then, when the relay module 30 can be further pushed inward, the module locking claws 14 climb over the module-side locking projections 43 and the module-side locking arms 42 can be resiliently restored. In this state, the locking surfaces of the module locking claws 14 and the locking surfaces of the module-side locking projections 43 engage with each other. Accordingly, the relay module 30 can be fixed in the retained state.

In the relay box 1 in the embodiment described above, both of the relay block 20 and the relay module 30 can be mounted on the same mounting portion 11. More specifically, the mounting portion 11 has a configuration in which the relay blocks 20 may be mounted, and also has a configuration in which the relay modules 30 may be mounted. The mounting portion 11 allows the relay blocks 20 and the relay modules 30 to be selectively mounted.

Here, when the relay blocks 20 can be mounted in the mounting portion 11, since two of the plug-in relays can be mounted in each of the relay block 20 and two of the relay block 20 can be mounted in each of the mounting portions 11, four of the plug-in relays can be mounted in the interior of each of the mounting portions 11. In contrast, when the relay modules 30 can be mounted in the mounting portion 11, six of the switching devices can be mounted in the interior of each of the mounting portions 11. Therefore, even the vehicle types of the motor vehicle can be the same, for example, the relay box 1 having the relay block 20 mounted in the mounting portions 11 may be used for high-grade vehicles which use a relatively large number of relays, and the relay box 1 having the relay modules 30 mounted in the mounting portions 11 may be used for low-grade vehicles which use a relatively small number of relays.

In this manner, selective usage of the relay modules 30 and the relay blocks 20 depending on the specifications such that the relay modules 30 having higher performance and higher relay-mounting density can be mounted on high-grade vehicles and the relay blocks 20 having lower relay-mounting density but being less expensive in comparison with the relay modules 30 can be mounted on the low-grade vehicles can be easily achieved.

Also, in the embodiment, the direction of mounting the relay block 20 in the mounting portion 11 can be different from the direction of mounting the relay module 30.

In other words, when mounting the relay block 20 in the mounting portion 11, the relay blocks 20 can be inserted upward from the lower opening of the mounting portion 11. In contrast, the relay module 30 can be configured to be inserted downward from the upper opening of the mounting portion 11. The reason is as follows.

When assembling the relay block 20 to the mounting portion 11 of the relay box 1, the plug-in relays are attached to the relay block 20 in advance, and then the relay block 20 is inserted into the mounting portion 11. At this time, since the cable lines being drawn out from the plug-in relays extend downward of the relay block 20, it can be convenient to insert the relay block 20 from the opening on the lower side of the mounting portion 11.

Also, after the relay box 1 has been mounted on the vehicle, maintenance can easily be performed. In other words, when any failure occurs in the plug-in relay, the plug-in relays may be pulled out and replaced from above the mounting portion 11 with the relay block 20 attached to the relay box 1. In contrast, when any failure occurs in the switching device, the relay module 30 in its entirety has to be replaced. In this case, the relay module 30 may be pulled out and replaced from above the mounting portion 11. In this manner, since the replacement work of the plug-in relay and the relay module 30 may be performed only above the mounting portion 11, good workability of maintenance can be ensured.

In this configuration, the block-side locking arms 25 to be provided on the side of the relay block 20 can be each formed into the cantilevered shape having a proximal end on the upper side and a free end on the lower side, and the block-side locking projections 26 each have a guiding surface 26B on the upper surface and a locking surface 26A on the lower surface. Then, the block latching portions 12 which can be provided on the side of the mounting portion 11 to be paired therewith each have the locking surface 12A on the upper surface and the guiding surface 12B on the lower surface. In contrast, the module-side locking arms 42 can be each formed into the cantilevered shape having a proximal end on the lower side and a free end on the upper side, and the module-side locking projections 43 each have the locking surface 43A on the upper surface and the guiding surface 43B on the lower surface. Then, the module locking claws 14 which can be provided on the side of the mounting portion 11 to be paired therewith each have the guiding surfaces 14B on the upper surface and the locking surfaces 14A on the lower surface.

In this manner, it can be beneficial to differentiate the direction of extension of the locking arms or the orientations of the locking surface or the guiding surface for causing the relay blocks 20 and the relay modules 30 to be engaged with the mounting portion 11 depending on the difference in mounting direction between the relay blocks 20 and the relay modules 30.

Therefore, in the mounting portion 11, the block latching portions 12 to be engaged with the relay blocks 20 and the module locking claws 14 to be engaged with the relay modules 30 can be mounted on the different wall portions. More specifically, the block latching portions 12 to be engaged with the relay block 20 can be provided on one (the front and rear wall portions 16F, 16B) of two pairs of the inner wall portions opposing to each other, and the module locking claws 14 to be engaged with the relay module 30 can be provided on the other pair (the left and right wall portions 16R, 16L). Accordingly, mounting of the relay block 20 and the relay module 30 different in mounting direction to the same mounting portion 11 can be enabled.

In order to enable the mounting of both of the relay blocks 20 and the relay modules 30 to the same mounting portion 11, reduction in size of the relay modules 30, which can be susceptible to size increase in comparison with the relay blocks 20, can be advisable. Therefore, in the relay modules 30 in the embodiment, a configuration of screw-tightening between the circuit component 31 and the lower case 32S can be added with a twist. In other words, a screw hole 53 for screw-tightening with respect to the circuit component 51 can be provided at a position behind a hood portion 52 of a lower case 51 (see FIG. 20) in the relay module of the related art, while the screw clamp portions 36 formed to be slightly higher than the hood portions 33 can be provided adjacent to the right side and the left side of the hood portions 33 in the relay module 30 in the embodiment. Then, the screw holes 37 can be provided on the screw clamp portions 36 at the positions higher than the ceiling wall 35 of the hood portions 33. In this manner, by providing the screw clamp portions 36 and the screw holes 37 so as to be deviated from the hood portions 33, the thickness of the relay modules 30 (the width in the fore-and-aft direction) can be reduced by an amount corresponding to the depth of the screw hole in comparison with the relay module 50 in the related art, so that reduction in size of the relay module 30 can be achieved.

The present invention is not limited to the exemplary embodiments described in the description and the drawings, and embodiments given below, for example, can be also included in the technical scope of the present invention.

In the embodiment described above, two of the relay blocks 20 can be mounted in each of the mounting portions 11. However, the number of the relay blocks to be mounted in the mounting portion is not limited, and one or three or more can be also applicable.

In the embodiment described above, the block latching portions 12 to be engaged with the relay block 20 and the module locking claws 14 to be engaged with the relay module 30 can be provided on the different wall portions of the mounting portion 11 with each other. However, if the mounting directions of the relay box can be the same as the mounting direction of the relay module, the engaging portions may be commonly used.

In the embodiment described above, the locking arms 25, 42 can be provided on the relay block 20 and the relay module 30, and the latching portion 12, module locking claw 14 engaging therewith can be provided in the mounting portion 11. However, a configuration in which the locking arms can be provided in the mounting portion and the latching portions can be provided on the relay block and the relay module can be also applicable.

In the embodiment described above, the mounting portion 11 can be opened in the vertical direction of the relay box 1, and the relay block 20 can be mounted from below and the relay module 30 can be mounted from above. However, for example, a configuration in which the mounting portion is opened in the left-and-right direction or in the fore-and-aft direction, and one of the relay box and the relay module is mounted from the left side or the front side, and the other one of those is mounted from the right side or the rear side is also applicable.

In the embodiments described above, the printed board of the circuit component 31 includes the semi-conductor switching devices mounted thereon. However, the invention is not limited thereto, and a configuration in which a mechanical relay is mounted on the printed board is also applicable. A configuration in which both of the semi-conductor switching devices and the mechanical relays are mounted on the printed board is also applicable.

In the embodiment described above, a single piece of the printed board can be accommodated in the module case 32 of the relay module 30. However, exemplary embodiments are not limited thereto, and a configuration in which plural printed boards are accommodated in the module case 32 may also be applicable.

The relay box 1 may be configured in such a manner that the upper surface of the main housing 10 can be covered with an upper cover, not shown, and the lower surface of the main housing 10 can be covered with a lower cover, not shown.

The invention claimed is:

1. An electric connection box comprising:
a base; and
a mounting portion provided on the base, in which a relay block having a plug-in relay mounted thereon or a relay module having a cover accommodating a circuit board with a switching device mounted thereon is selectively mounted, wherein
a mounting direction of the relay block is different from a mounting direction of the relay module with respect to the mounting portion,
a block engaging portion for engagement with the relay block and a module engaging portion for engagement with the relay module are provided on respective wall portions of the mounting portion, the respective wall portions being different from each other,
a block-side locking portion for engagement with the block engaging portion is provided on the relay block,
a module-side locking portion for engagement with the module engaging portion is provided on the relay module,
one of the block engaging portion or the block-side locking portion is a first locking arm provided with a first locking projection, and the other of the block engaging portion or the block-side locking portion is a first latching portion to be engaged with the first locking projection,
the first locking arm is formed into a cantilevered shape having a proximal end on the front side and a free end on the rear side in the direction of mounting of the relay block in the mounting portion,
one of the first locking projection or the first latching portion, provided on the side of the relay block, has a locking surface on a wall surface thereof on the rear side in the direction of mounting of the relay block in the mounting portion, and the other of the first locking projection or the first latching portion has a locking surface on a wall surface thereof on the front side in the direction of mounting of the relay block in the mounting portion,
one of the module engaging portion or the module-side locking portion is a second locking arm provided with a second locking projection, and the other of the module engaging portion or the module-side locking portion is a second latching portion to be engaged with the second locking projection,
the second locking arm is formed into a cantilevered shape having a proximal end on the front side and a free end on the rear side in the direction of mounting on the mounting portion of the relay module, and
one of the second locking projection or the second latching portion, which is provided on the side of the relay module, has a locking surface on a wall surface thereof on the rear side in the direction of mounting of the relay module in the mounting portion, and the other of the second locking projection or the second latching portion has a locking surface on a wall surface thereof on the front side in the direction of mounting of the relay module in the mounting portion.

2. The electric connection box according to claim 1, wherein the relay module is provided with a connector portion fixed to the circuit board and configured to have a hood portion, wherein the connector portion is capable of being fitted to an external connector, and
the connector portion is provided with a fixing portion for fixing the connector portion to the circuit board at a position deviated from the hood portion.

3. The electric connection box according to claim 1, wherein the relay block is configured to allow the plug-in relay to be mounted and demounted.

4. The electric connection box according to claim 1, wherein the mounting portion is configured to allow the relay module to be mounted and demounted.

5. A relay module configured to be mountable in the electric connection box according to claim 1, comprising:
a connector portion fixed to the circuit board and configured to have a hood portion, wherein the connector portion is capable of being fitted to an external connector, wherein
the connector portion is provided with a fixing portion for fixing the connector portion to the circuit board at a position deviated from the hood portion.

* * * * *